(12) United States Patent
Beckers et al.

(10) Patent No.: US 10,753,890 B2
(45) Date of Patent: Aug. 25, 2020

(54) HIGH RESOLUTION X-RAY DIFFRACTION METHOD AND APPARATUS

(71) Applicant: Malvern Panalytical B.V., Almelo (NL)

(72) Inventors: Detlef Beckers, Almelo (NL); Alexander Kharchenko, Almelo (NL); Milen Gateshki, Almelo (NL); Eugene Reuvekamp, Almelo (NL)

(73) Assignee: MALVERN PANALYTICAL B.V., Almelo (NL)

( * ) Notice: Subject to any disclaimer, the term of this patent is extended or adjusted under 35 U.S.C. 154(b) by 99 days.

(21) Appl. No.: 15/913,623

(22) Filed: Mar. 6, 2018

(65) Prior Publication Data

US 2018/0259464 A1 Sep. 13, 2018

Related U.S. Application Data

(60) Provisional application No. 62/469,244, filed on Mar. 9, 2017.

(51) Int. Cl.
*G01N 23/20091* (2018.01)
*G01N 23/20008* (2018.01)

(52) U.S. Cl.
CPC . *G01N 23/20091* (2013.01); *G01N 23/20008* (2013.01); *G01N 2223/0563* (2013.01); *G01N 2223/315* (2013.01); *G01N 2223/5015* (2013.01); *G01N 2223/62* (2013.01)

(58) Field of Classification Search
CPC ..... G01N 2223/0563; G01N 2223/315; G01N 2223/5015; G01N 2223/62; G01N 23/20008; G01N 23/20091
See application file for complete search history.

(56) References Cited

U.S. PATENT DOCUMENTS

| | | | |
|---|---|---|---|
| 4,364,122 A | 12/1982 | Wolfel et al. | |
| 4,958,363 A * | 9/1990 | Nelson | B82Y 10/00 378/145 |
| 5,892,809 A | 4/1999 | Wittry | |

(Continued)

FOREIGN PATENT DOCUMENTS

| | | |
|---|---|---|
| CN | 104 634 799 | 5/2015 |
| EP | 1 511 043 | 3/2005 |

(Continued)

OTHER PUBLICATIONS

Michaelsen et al., "Improved Graded Multilayer Mirrors for XRD Applications", Advances in X-ray Analysis, 10 vol. 42, p. 308 to 320, presented at the Denver X-ray Conference on Applications of X-ray Analysis, International Centre for Diffraction Data, Jan. 2000.

*Primary Examiner* — Marcus H Taningco
(74) *Attorney, Agent, or Firm* — Leason Ellis LLP

(57) ABSTRACT

An X-ray diffraction apparatus for high resolution measurement combines the use of an X-ray source with a target having an atomic number Z less 50 with an energy resolving X-ray detector having an array of pixels and a beta radiation multilayer mirror for selecting the K-beta radiation from the X-ray source and for reflecting the K-beta radiation onto the sample where it is diffracted onto the energy resolving X-ray detector. The sample may in particular be in transmission. The sample may be a powder sample in a capillary.

18 Claims, 3 Drawing Sheets

(56) References Cited

U.S. PATENT DOCUMENTS

| | | | | |
|---|---|---|---|---|
| 6,069,934 A * | 5/2000 | Verman | ............ | G01N 23/20016 |
| | | | | 378/73 |
| 6,226,349 B1 * | 5/2001 | Schuster | ................ | G01N 23/20 |
| | | | | 378/81 |
| 8,867,704 B2 * | 10/2014 | Schipper | .......... | G01N 23/20091 |
| | | | | 378/71 |
| 2011/0255668 A1 * | 10/2011 | Hoghoj | .................. | B82Y 10/00 |
| | | | | 378/132 |
| 2011/0268252 A1 | 11/2011 | Ozawa et al. | | |

FOREIGN PATENT DOCUMENTS

| | | |
|---|---|---|
| JP | 2003 014894 | 1/2003 |
| JP | 2004 117343 | 4/2004 |
| JP | 2006-126150 | 5/2006 |
| JP | 2015-78835 | 4/2015 |
| WO | WO 2011/002037 | 1/2011 |

* cited by examiner

HIGH RESOLUTION X-RAY DIFFRACTION METHOD AND APPARATUS

CROSS-REFERENCE TO RELATED PATENT APPLICATIONS

This application is based on and claims priority to U.S. Provisional Patent Application 62/469,244, filed Mar. 9, 2017, the entire contents of which is incorporated by reference herein as if expressly set forth in its respective entirety herein.

FIELD OF INVENTION

The present invention relates to methods and apparatus for X-ray diffraction (XRD) using a K-beta radiation mirror and a high energy resolution detector.

BACKGROUND TO THE INVENTION

The analysis of samples, especially powder samples, by X-ray diffraction is a very useful technique for determining the composition of the sample.

X-ray diffraction typically uses radiation emitted from an X-ray source which uses a target of a single predetermined element. Targets include cobalt, chromium, copper, molybdenum and silver.

The X-rays emitted by such targets are not fully monochromatic, as each target can emit radiation in a number of lines in addition to a continuous Bremsstrahlung spectrum. In particular, targets can emit radiation from a K line which may be subdivided into a K-alpha and a K-beta line.

Typically, more energy is emitted in the K-alpha line than the K-beta line so X-rays are often passed through a monochromator or beta-radiation filter to select the K-alpha line which is then used for X-ray diffraction measurements.

At sufficient energy resolutions, the K-alpha line is in fact a doublet, and resolves into two lines, a K-alpha-1 and a K-alpha-2 line with an intensity ratio of around 2:1. Accordingly, for high resolution X-ray diffraction measurements it is necessary to use a monochromator which is sufficient to select one of these lines to ensure that the X-rays used are sufficiently monochromatic. Bragg reflections may be used.

In view of the very high alignment accuracy required for X-ray diffraction measurements, the number of components that need to be aligned causes considerable difficulty in setting up and maintaining X-ray diffraction apparatus. Moreover, the intensity of X-rays may be reduced in such arrangements in order to achieve sufficient monochromaticity, since in conventional arrangements high resolution monochromators select only a very narrow solid angle range of X-rays emitted from the X-ray source.

An apparatus which addresses such considerations is disclosed in US2011/0268252, which describes apparatus suitable for X-ray diffraction measurements of powder samples with a complex arrangement for creating a virtual source with a very narrow energy bandwidth, i.e. with a monochromator that is sufficiently precise that it can separate out the K-alpha-1 and K-alpha-2 lines so that measurement is only made using one of these lines.

There is a desire for methods and apparatus for X-ray diffraction which are capable of achieving similar accuracy and resolution without the need for such accurate monochromators capable of selecting the K-alpha-1 from the K-alpha-2 line.

SUMMARY OF THE INVENTION

In a first aspect of the invention, there is provided X-ray diffraction apparatus according to claim 1.

In embodiments, there is provided an X-ray diffraction apparatus for high resolution measurement combining the use of an X-ray source with a target having an atomic number Z less than 50 (and preferably less than 30) with a beta radiation multilayer mirror for selecting the K-beta radiation from the X-ray source and for reflecting the K-beta radiation onto the sample. The beam of X-rays may diffract in the sample onto an energy resolving X-ray detector having an array of pixels.

Embodiments of the invention also relate to methods of X-ray diffraction.

BRIEF DESCRIPTION OF DRAWINGS

Embodiments of the invention will now be described with reference to the accompanying drawings, in which.

DETAILED DESCRIPTION OF THE INVENTION

Figure 1:
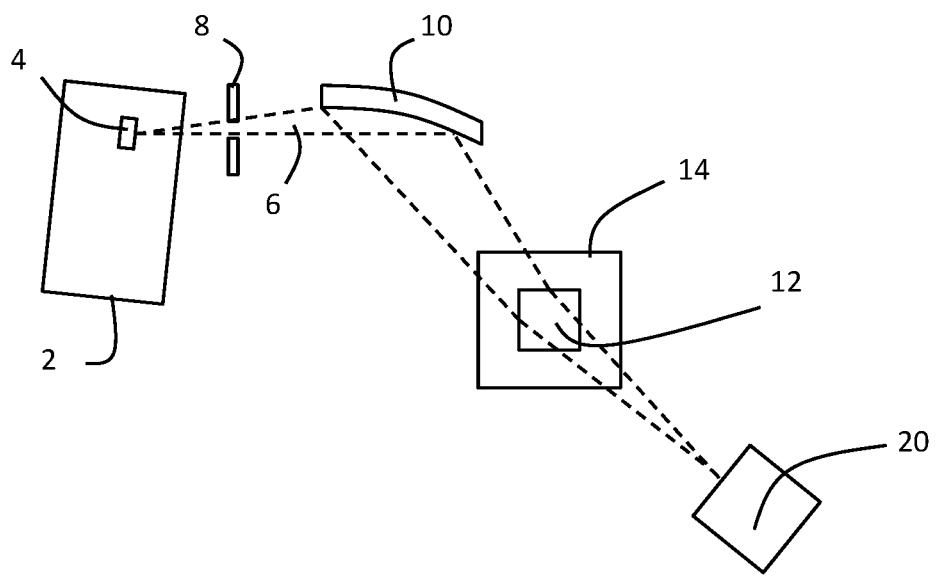
FIG. 1 shows a first embodiment of the invention.

The inventors have realised that K-beta radiation from low atomic number X-ray sources is essentially monochromatic for the purposes of typical powder diffraction experiments. For example, with a copper source (Z=29), the K-beta-1 line is at 8.905 keV and the K-beta-3 line is at 8.903 keV, with a total intensity of 20% of the K-alpha-1 line. This can be treated as effectively monochromatic. Moreover, for such low atomic number sources the amount of k-beta-2 radiation is very low. For copper, the intensity of the k-beta-2 radiation is about 0.1% of the intensity of the K-alpha-1 line and hence only about 0.5% of the K-beta-1 and K-beta-3 lines—for targets with lower atomic numbers there is even less—virtually no—K-beta-2.

For higher atomic number sources such as molybdenum and silver the amount of K-beta-2 radiation can be 3% of the intensity in the K-alpha-1 line, with 15% in the K-beta-1 line and 8% in the K-beta-3 line—with Ag the percentages are higher. Although for sources with atomic numbers higher than 30, the K-beta-1 and K-beta-3 line start to deviate in energy, they can still be considered monochromatic for the purposes of X-ray diffraction experiments.

Accordingly, the inventors have realised that there is a benefit in using K-beta radiation with an X-ray source with an atomic number Z less than 50 (and particularly less than 30) for X-ray diffraction measurements, since such a combination allows the use of effectively monochromatic radiation only requiring the selection of the K-beta-1,3 line from the K-alpha line in the case of atomic numbers lower than 30 or from the K-beta-2 line in the case of atomic numbers between 30 and 50. Such an energy resolution is possible in the X-ray detector, avoiding the need for additional monochromators. This reduces difficulty in setting up and maintaining in accurate alignment of such additional components.

When using K-alpha radiation for measurement, it is possible to use a selective mirror to select only the K-alpha radiation. Such a mirror may attenuate the K-beta radiation by a factor of around 100, which is typical for a graded multilayer mirror. In view of the fact that the intensity of K-alpha radiation incident on the selective mirror is five times higher than the intensity of K-beta radiation such an arrangement can ensure that the intensity of K-beta radiation is attenuated to only 0.2% of the intensity of K-alpha radiation, which is sufficient for most applications.

In contrast, the inventors have realised that in order to achieve useful acceptance angles, multilayer mirrors optimised for K-beta reflection typically reflect enough K-alpha radiation that the intensity of K-alpha radiation is 1% to 5% of the intensity of K-beta radiation. Such an intensity is not low enough to treat the radiation as essentially monochromatic when carrying out X-ray diffraction.

The inventors have realised that although a K-beta multilayer mirror may not be enough on its own, it makes possible the use of an energy resolving X-ray detector with a lower ability to discriminate between K-alpha and K-beta radiation for atomic numbers lower than 30 or discriminate between K-beta-1,3 and K-beta-2 radiation for atomic numbers between 30 and 50 and still achieve high resolution results.

By selecting only K-beta-1,3 radiation when using an X-ray source with targets with low atomic numbers, less than 50 (and preferably less than 30), particularly good results may be obtained, since the radiation is highly monochromatic—the radiation includes only K-beta-1 and K-beta-3 radiation and at low atomic numbers the wavelengths of K-beta-1 and K-beta-3 radiation are extremely close indeed.

Such a simple apparatus can achieve results with very high degrees of monochromaticity, similar to that achieved in US2011/0268252 but with a much simpler arrangement. In particular, in US 2011/0268252 the K-alpha radiation is selected using Johansson crystals on the incident side. Such Johansson crystals are complex to set up and reduce the X-ray intensity.

In embodiments, the sample holder may hold the sample such that the X-rays pass through the sample before reaching the detector, i.e. in a transmission mode as opposed to a reflection mode. This includes the possibility that the sample is a powder sample in a capillary. In such a transmission geometry (including with a capillary) it is difficult to achieve sufficient energy resolution in the detector alone, without adopting geometries with multiple components and/or long measurement times, but by using a K-beta multilayer mirror the energy resolution required of the detector can be more readily achieved.

In particular embodiments, the K-beta radiation multilayer mirror is a focussing multilayer mirror arranged to focus the diffracted beam onto the energy resolving X-ray detector. In this way, a relatively high intensity of X-rays can be achieved without the need for additional components—the K-beta radiation multilayer mirror carries out both the focussing and wavelength selection.

The focussing multilayer mirror may be a graded focussing multilayer mirror.

In particular, in a transmission geometry or using a capillary, when using slits to determine the beam path, a very narrow slit opening would be required to get sufficient angular resolution. This greatly reduces X-ray intensity and hence increases measurement times. Using a focussing mirror instead can achieve a good combination of X-ray intensity and good angular resolution.

The use of the K-beta radiation multilayer mirror to provide both focussing and monochromatization allows for a minimal number of components and hence an apparatus that is cost-effective both in manufacture and use. The mirror on its own cannot provide sufficient monochromatization but in combination with an energy resolving X-ray detector high resolution X-ray diffraction measurements may be made. The energy resolving X-ray detector itself does not need to be extremely high resolution since some of the selection is carried out by the K-beta radiation multilayer mirror.

In alternative embodiments the K-beta radiation multilayer mirror can be a parabolic mirror.

In an example, the energy resolution of the detector may be better than $\Delta E/E$ of 0.2 FWHM (full width at half maximum) for example $\Delta E/E=0.01$ to 0.1, preferably 0.05 to 0.075 FWHM, where E is the energy of the line being detected and $\Delta E$ is the energy resolution. In specific examples, this energy resolution ($\Delta E$) could be 440 eV to 660 eV for Cu K-beta radiation or 380 eV to 570 eV for Co K beta radiation.

In preferred embodiments, the X-ray detector has an energy resolution sufficient to effectively select for K-beta radiation over K-alpha radiation with a sensitivity to K-beta radiation of at least 10, preferably 25 times the sensitivity to K-alpha radiation. Note that the X-ray detector may detect X-rays as a function of energy and the selection of the K-beta radiation over K-alpha may be carried out in processing.

In embodiments, the energy resolving detector may be a detector with an array of pixels, such as for example a high resolution strip detector.

X-ray diffraction apparatus of this type can achieve very high measurement resolutions as the radiation is effectively highly monochromatic without requiring very precise monochromators which would significantly reduce X-ray intensity. Accordingly, apparatus according to the invention may achieve fast measurement times which can be particularly important in a powder sample.

Moreover, the apparatus can be constructed in a relatively simple way, reducing the time spent to align the apparatus and reducing costs.

A first embodiment of the invention is illustrated in FIG. 1.

An X-ray source 2 has a low atomic weight target 4 which emits a beam of x-rays 6 which passes through a single slit 8. The X-ray beam is incident on a mirror 10 for selecting the k-beta radiation over the alpha radiation.

A suitable multilayer mirror is proposed in Michaelsen et al, Advances in X-ray Analysis, Volume 42, page 308 to 320, presented at the Denver X-ray Conference on Applications of X-ray Analysis, International Centre for Diffraction Data, 2000. In particular, the mirror may be a curved Göbel mirror.

In an alternative arrangement the mirror may be a parabolic multilayer mirror.

The radiation from the mirror 10 is directed onto a sample 12 on sample stage 14. The radiation is diffracted onto an energy resolving X-ray detector 20, in this instance a high resolution strip detector, i.e. a detector which is capable of spatial resolution in a single direction.

In the arrangement of FIG. 1, the mirror 10 is a focussing mirror that focuses the diffracted beam 6 onto the position of the X-ray detector 20—note that the beam is slightly diffracted as it passes through the sample.

The arrangement of FIG. 1 can accordingly achieve high resolutions with an effectively very highly monochromatic beam in a simple apparatus with a small number of components.

Note in particular that in the path of the beam the only components after the mirror 10 are the sample supported by the sample holder and the energy resolving X-ray detector 20. Such an apparatus is low cost to manufacture and to set up.

Figure 2:
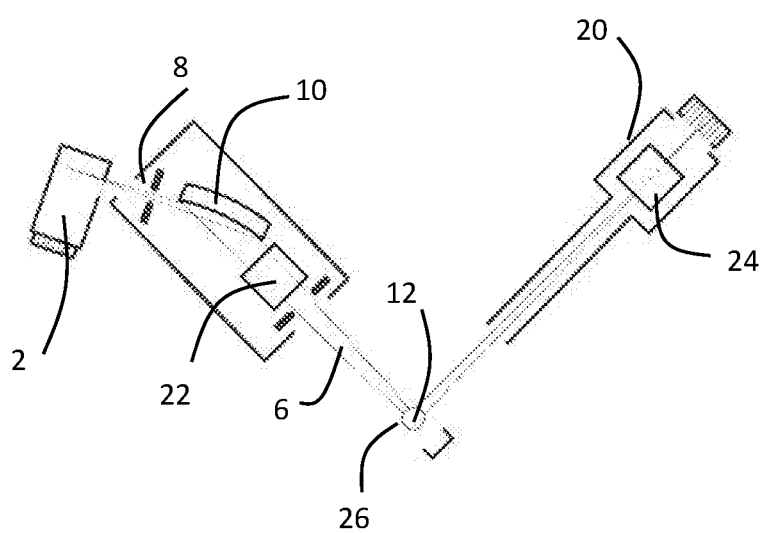
FIG. 2 shows a second embodiment of the invention.

FIG. 2 illustrates an alternative embodiment of the invention, in which the sample 12 is held by a capillary 26 holding material to be examined, for example powder. The apparatus is well suited to the measurement of powder samples, in spite of the simple nature of the apparatus with relatively few components. In the specific embodiment illustrated in FIG. 2 the use of a single mirror 10 that functions to select for K-beta radiation over K-alpha radiation as well as to focus the X-ray beam 6 allows for apparatus with a minimal number of components.

Note that the drawing of FIG. 2 includes some non-essential components in particular Soller slits 22 on the incident side and Soller slits 24 on the measurement side. Such slits are not essential but may be used to select a small angle of X-ray beam if required.

Figure 3:
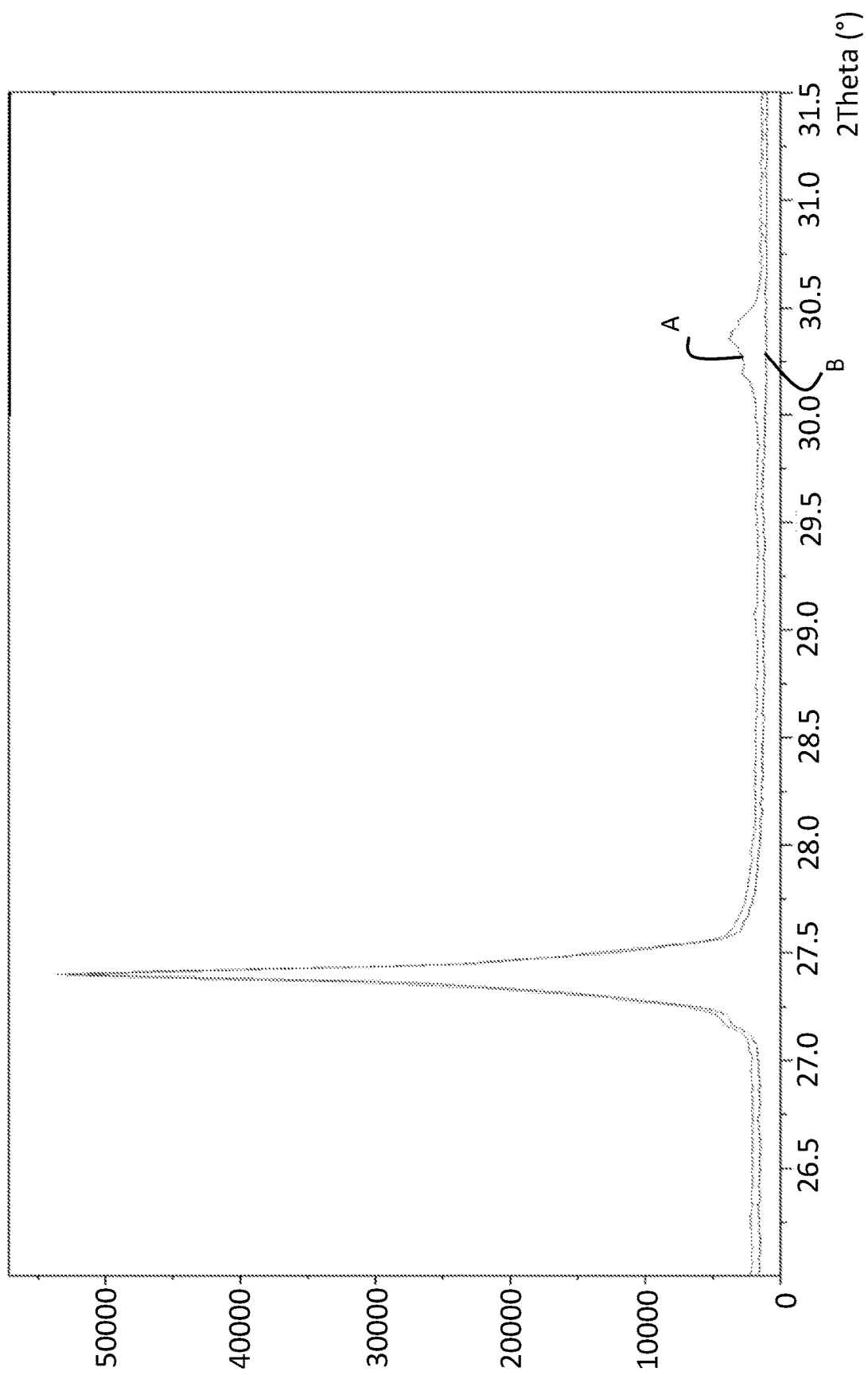
FIG. 3 shows results obtained using a k-beta mirror both with and without the use of an energy sensitive detector.

FIG. 3 illustrates measurements of a $LaB_6$ sample in a transmission measurement as illustrated above in FIG. 1. In both cases, the source was a Cu source emitting K-alpha radiation at 8.04 keV and K-beta radiation at 8.90 keV. A focusing beta mirror was used to select the k-beta radiation, i.e. to filter out the k-alpha lines.

Two graphs are shown. Graph A was measured using a conventional solid state line detector and represents a comparative example. Graph B is an embodiment of the invention using an energy resolving solid state line detector. Both graphs show the peak at an angle 2θ of 27.4° corresponding to the K-beta line of the $LaB_6$ [1 1 0] reflection The improvement in Graph B over Graph A can be seen at an angle 2θ of 30.4°. Note that graph A shows a small peak. This peak is the peak generated by K-alpha line of the $LaB_6$ [1 1 0] reflection and is the result of incomplete suppression of that k-alpha radiation by the k-beta selecting multilayer mirror. As a result graph A demonstrates that simply using a k-beta mirror without using an energy resolving detector does not result in high energy resolution output—the additional peak at 30.4° is essentially an artefact.

In contrast, graph B shows no peak at 30.4° and the only peak is the well resolved peak at 27.4°. This demonstrates that high resolutions may be obtained using a combination of a low atomic number X-ray source, a K-beta radiation multilayer mirror for selecting the K-beta radiation, and an energy resolving X-ray detector.

The invention claimed is:

1. An X-ray diffraction apparatus, comprising:
    an X-ray source with a target having an atomic number Z less than 50 for emitting a beam of X-rays;
    an energy resolving X-ray detector, wherein the energy resolution of the X-ray detector is sufficient to select for K-beta radiation over K-alpha radiation with a sensitivity to K-beta radiation of at least 10 times the sensitivity to K-alpha radiation; and
    a sample holder for holding a sample such that the beam of X-rays from the X-ray source are incident on the sample and are diffracted onto the X-ray detector;
    wherein the X-ray diffraction apparatus further comprises a K-beta radiation multilayer mirror for selecting the K-beta radiation from the X-ray source and for reflecting the K-beta radiation onto the sample.

2. The X-ray diffraction apparatus according to claim 1, wherein the sample holder is adapted to hold the sample in a transmission geometry such that the beam of X-rays from the X-ray source passes through the sample and is diffracted onto the X-ray detector.

3. The X-ray diffraction apparatus according to claim 1, wherein the sample holder is adapted to hold, as the sample, a capillary holding a powder.

4. The X-ray diffraction apparatus according to claim 1, wherein the K-beta radiation multilayer mirror is a focussing multilayer mirror arranged to focus the diffracted beam onto the energy resolving X-ray detector.

5. The X-ray diffraction apparatus according to claim 1, wherein the combination of the K-beta radiation multilayer mirror and energy resolving X-ray detector is sufficient to attenuate the measured intensity of K-alpha radiation with respect to K-beta radiation by at least 1000 times.

6. The X-ray diffraction apparatus according to claim 5, wherein each of the K-beta radiation multilayer mirror and energy resolving X-ray detector is sufficient to attenuate the measured intensity of K-alpha radiation with respect to K-beta radiation by at least 5 times.

7. The X-ray diffraction apparatus according to claim 1, wherein the only components in the beam path after the K-beta radiation multilayer mirror are the sample in the sample holder and the energy resolving X-ray detector.

8. The X-ray diffraction apparatus according to claim 1, wherein the multilayer K-beta radiation mirror is the only monochromator.

9. The X-ray diffraction apparatus according to claim 1, wherein the X-ray detector has a linear array of pixels.

10. The X-ray diffraction apparatus according to claim 1, wherein the target has an atomic number Z less than 30.

11. A method of X-ray diffraction, comprising:
    a. generating a beam of X-rays from an X-ray source with a target having an atomic number Z less than 50;
    b. directing the beam of X-rays onto a K-beta radiation multilayer mirror to select the K-beta radiation from the X-ray source and to reflect the K-beta radiation onto the sample;
    c. directing the K-beta X-rays onto a sample such that the X-rays are diffracted by the sample; and
    d. measuring the diffracted X-rays using an energy resolving X-ray detector, and selecting for K-beta radiation over K-alpha radiation by the energy resolving X-ray detector, wherein the energy resolving X-ray detector has a sensitivity to K-beta radiation of at least 10 times the sensitivity to K-alpha radiation.

12. The method of X-ray diffraction according to claim 11, wherein the sample is held in a transmission geometry such that the beam of X-rays from the X-ray source passes through the sample and is diffracted onto the X-ray detector.

13. The method of X-ray diffraction according to claim 11, wherein the sample is a capillary holding a powder.

14. The method of X-ray diffraction according to claim 11, wherein the K-beta radiation multilayer mirror is a focussing multilayer mirror, the step of directing the beam of X-rays comprising focussing the beam of X-rays so that the diffracted beam is focussed on the energy resolving X-ray detector.

15. The method of X-ray diffraction according to claim 11, wherein the combination of the K-beta radiation multilayer mirror and energy resolving X-ray detector is sufficient to attenuate the measured intensity of K-alpha radiation with respect to K-beta radiation by at least 1000 times.

16. The method of X-ray diffraction according to claim 11, wherein the only components in the beam path after the K-beta radiation multilayer mirror are the sample in the sample holder and the energy resolving X-ray detector.

17. The method of X-ray diffraction according to claim 11, wherein the X-ray detector has an array of pixels.

18. The method of X-ray diffraction according to claim 11 wherein the sample is a powder sample.

* * * * *